United States Patent [19]

Moon

[11] 3,890,022
[45] June 17, 1975

[54] CORNER FITTING

[76] Inventor: Howard R. Moon, 42 Rockwell St., Fort Atkinson, Wis. 53538

[22] Filed: Sept. 3, 1974

[21] Appl. No.: 502,538

[52] U.S. Cl........ 312/140; 312/257 R; 312/257 SK; 312/111; 403/171
[51] Int. Cl. ............................................. A47f 3/00
[58] Field of Search.......... 312/257 R, 257 SK, 111, 312/140; 403/295, 297, 171, 172, 176

[56] References Cited
UNITED STATES PATENTS

| 2,886,359 | 5/1959 | Herrschaft | 403/171 |
|---|---|---|---|
| 2,956,705 | 10/1960 | Clingman | 312/257 SK |
| 3,044,656 | 7/1962 | Combs et al. | 312/257 SK |
| 3,182,846 | 5/1965 | La Kaff | 312/140 |
| 3,532,369 | 10/1970 | Reilly | 403/176 |
| 3,721,484 | 3/1973 | Macioge et al. | 312/140 |

FOREIGN PATENTS OR APPLICATIONS

| 1,086,885 | 10/1967 | United Kingdom | 312/111 |
|---|---|---|---|
| 1,260,911 | 4/1961 | France | 312/140 |

*Primary Examiner*—Paul R. Gilliam
*Assistant Examiner*—Victor N. Sakran

[57] ABSTRACT

A corner fitting is provided in which from two to six tubes may be secured together in right angular relation. A square block forms the corner. By drilling a hole in the center of any surface of the block, an expandable rectangular fitting may be secured against this surface. By turning the tube ninety degrees in either direction, the expandable fitting will expand and securely lock the end of the tube to the block.

10 Claims, 9 Drawing Figures

PATENTED JUN 17 1975

3,890,022

SHEET 1

CORNER FITTING

This invention relates to an improvement in corner fitting wherein it is desired to provide a means of securing one or more square tubes to a square corner block.

BACKGROUND OF THE INVENTION

It is often desirable to form a frame for shelving, display and the like, through the use of square tubing. One of the difficulties has been in providing an adequate means of securing the ends of the tubing to the corner blocks so that they cannot accidentally become disengaged. Various means have been provided for accomplishing this result, but it is difficult to provide connecting means which are completely concealed. It is the purpose of the present invention to provide a means of anchoring square tubing to a square block of approximately the same outer dimensions as the tubing, and to accomplish this in such a manner that it is concealed when the assembly is complete.

SUMMARY OF THE INVENTION

The present invention resides in the provision of a corner block which is square, and accordingly provided with six square surfaces of equal size. This block is used in conjunction with tubing which is preferably the same dimension as each of the faces of the block. The arrangement is such that by inserting the tubing over the necessary fastening means and rotating the tubing throughout the angle of 90°, the tubing is locked to the block to the extent that it is virtually unseparable therefrom without again rotating the tubing.

A feature of the present invention resides in the provision of an expandable block having a hearing plate at one end, and including a securing pin to the surface center of the side of the block. A securing pin extends through the expandable member and through the bearing plate, and normally rests in a generally V-shaped notch at the end of the bearing plate. A cross pin engages in the base of the notch, and while in this position, the expandable member is not expanded. However, by rotating the bearing plate through an angle of 90°, the cross pin rides on the sides of the V-shaped notch and engages into indentations on opposite sides of the notch, and at right angles to the base of the notch. When this is done, the tubing is virtually unseparable from the square block.

A further feature of the present invention resides in the provision of a recess or aperture which may be drilled in the center of any or all of the surfaces of the square block. The exterior of the pin is straight knurled, one the connecting pin is driven into the aperture in the block it is virtually impossible to pull it out, thus anchoring the pin to the block.

A further feature of the present invention resides in the provisions of means for preventing rotation between the expandable member and the bearing plate so that both rotate in unison.

A further feature of the present invention resides in the provision of a second bearing plate encircling the pin adjoining the end of the expandable member and engageable with it to prevent rotation. This bearing plate prevents the end of the tube from scratching or marring the surface of the adjoining tube as the tube with the block is rotated into right angular relation therewith.

Another feature of the present invention lies in the fact that the tube may be rotated 90° in either direction about its axis so that the expandable member will expand regardless of which way the tubular member is rotated about its axis.

A further feature of the present invention resides in the provision of a means for interlocking a tube and a flat surface and in which the degree of displacement of the expandable member may be varied by changing the depth of the groove in the grooved bearing plate.

These and other objects and novel features of the present invention will be more clearly and fully set forth in the following specification and claims.

In the drawings forming a part of the specification,

Figure 9:
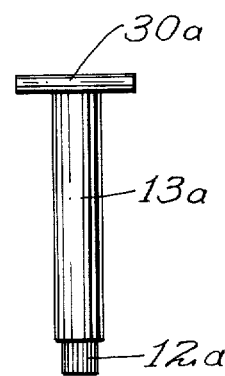
Figure 8:
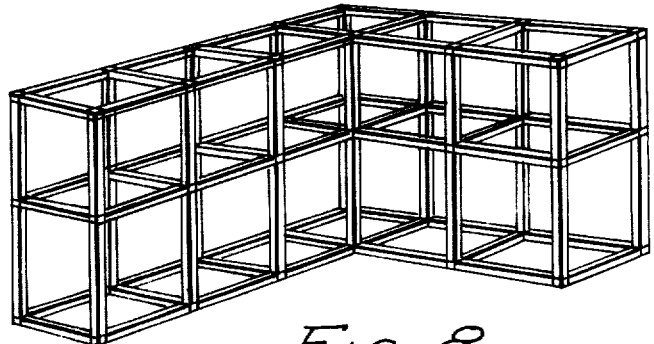
FIG. 8 is a perspective view of a typical form of framing or shelving which may be produced by the structure described.

FIG. 9 shows a T-shaped bolt which may be used in place of the connecting pin 13 and the split tubular pin 30. In this structure, the T-shaped head 30a is integral with the pin 13a.

Figure 1:
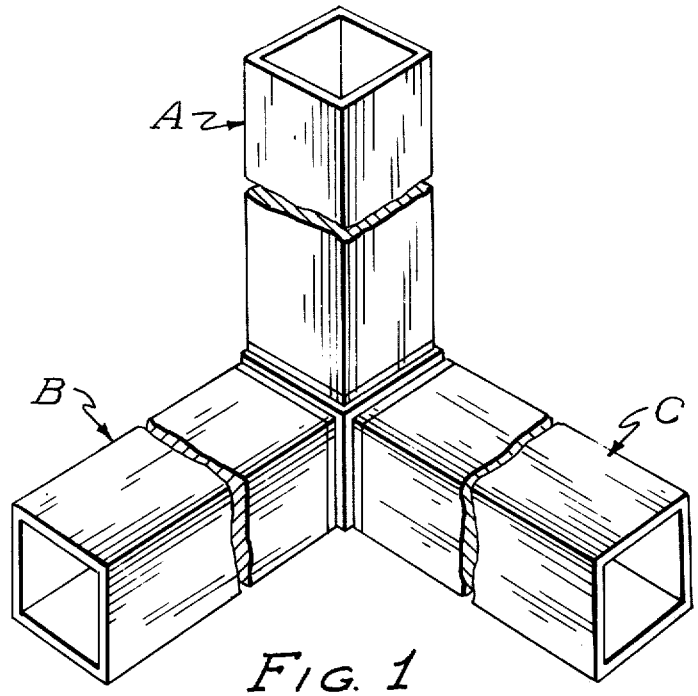
FIG. 1 is a perspective view of the three tubular members secured to a securing block to extend in right angular relation.
Figure 2:
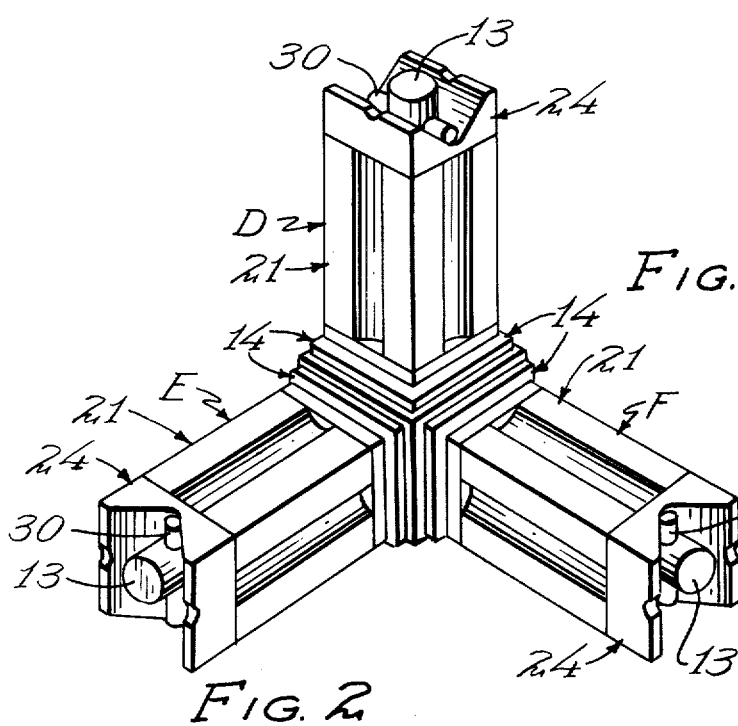
FIG. 2 is a perspective view of the corner shown in FIG. 1 before the tubing has been applied thereto, and before the expandable members have been expanded.

FIG. 1 of the drawings shows a connection between three tubular members A, B and C which are connected to a corner block which is not readily identifiable in this figure. FIG. 2 of the drawings shows the three connecting members D, E and F which are arranged in readiness for the connection of the tubes A, B and C. In view of the fact that all of the connections are similar, and as up to six tubular members can be connected to each corner block, a single connecting member will be described in detail, the connecting member D being shown in FIG. 3 of the drawings as well as in FIGS. 5, 6 and 7 for the purpose of illustration.

Figure 3:
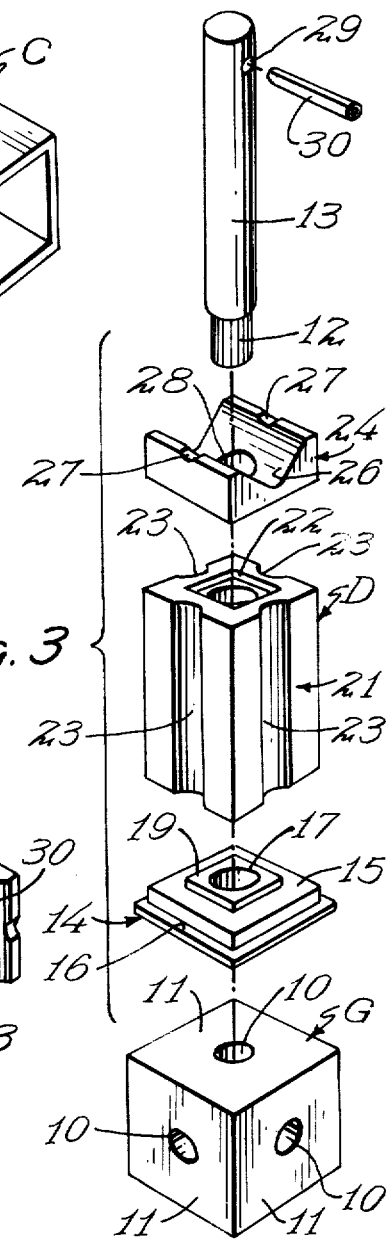
FIG. 3 is an exploded view showing the various parts which form each of the connectors.

The corner block is shown in FIG. 3 by the letter G and is square, having six surfaces of equal size. The corner block G is shown adapted to form the construction illustrated in FIGS. 1 and 2, and accordingly is provided with three apertures 10 in adjoining square surfaces 11 thereof. The aperture 10 are drilled to receive the straight knurled end 12 of a connecting pin 13. When the connecting pin 13 is driven into its aperture 10, it is extremely difficult to remove it.

FIG. 3 shows a lower bearing plate 14 having a central body portion 15 which is of upper dimensions to snuggly fit within the tube A. A narrow flange 16 extends peripherally from the bottom of the center portion 15, the outside dimensions of the flange 16 being substantially equal to the dimensions of a block surface 11 and of the outer dimensions of the tube such as A. A flange 16 is exaggerated in thickness, and is virtually invisible when the tube is connected in place.

The bearing plate 14 is povided with a central aperture 17 extending therethrough which is of proper dimensions to accommodate the connecting pin 13. The center portion 15 of the bearing plate is also provided with an upward projection 19 which is shown as square in outline, and which is designed for accommodation in a square aperture in the expandable member 21. This square aperture 20 is visible in FIGS. 6 and 7 and is similar in form to the square aperture 22 in the upper end of the expandable block 21 as indicated in FIG. 3.

The expandable member 21 is formed of rubber or other such expandable material and is preferably provided with longitudinal grooves 23 along each of its vertical sides as indicated in FIG. 3. The grooves 23 are provided to permit expansion of the expandable member when longitudinal compressive force is exerted thereagainst.

An upper bearing plate or cam plate 24 is provided with a downwardly extending square projection 25 (see FIGS. 6 and 7) which is designed to fit within the expandable member 21. The cam plate 24 is provided with a central aperture 28 designed to freely or loosely (for clearance) accommodate the connecting pin 13, and is provided with a V-shaped notch 26 extending from end to end thereof in one direction. Indentations 27 are provided in the upper edges of the block 24, which indentations are at right angles to the base of the groove 26.

An aperture 29 extends through the axis of the connecting pin 13 and at right angles thereto. The aperture 29 is designed to accommodate a split tubular pin 30 for a purpose which will be described.

In the present construction the material forming the surface of the corner block is the same alloy as that forming the tubing. As a result, over a period of time, the appearance remains the same, and the color of the corner blocks matches that of the tubing. This is in contrast to generally similar tubular structures formed by others, in which the color of the tubing varies from that of the other fittings, detracting from the general appearance of the structure as a whole.

It should also be noted that because of the V-grooves in the sides of the rubber block; the force is exerted only into the corners of the aluminum tubing thereby eliminating side wall distortion and providing maximum resistance to the rubber block due to the higher strength in the corners of the tubing.

In assembling the construction, the tubular pin 30 is driven into the hole 29 of the connecting pin 13 to extend equally on opposite sides of the connecting pin 13. The cam plate 24 is then placed onto the pin 13, with the pin 30 engaging into the groove 26. The expandable block 21 is placed onto the connecting pin 13 with the projection 25 engaging into the recess 22. The bearing plate 14 is placed onto the connecting pin 13 with the projection 19 engaging in the recess 20 in the rubber block. The entire assembly is aligned with the square block G and then driven into place, the end 12 of the pin 13 engaging into the corner block recess 10.

Figure 5:
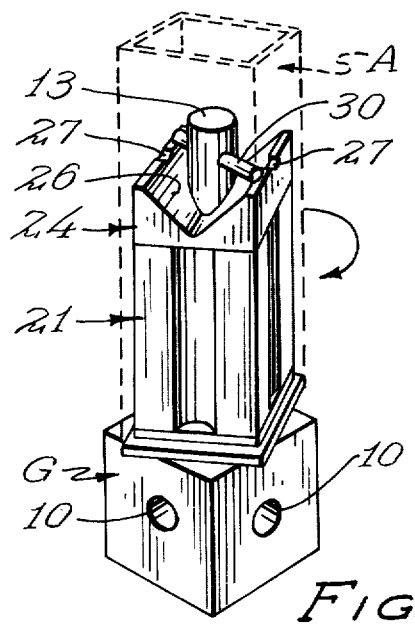
FIG. 5 is a perspective view of the expandable means in partially expanded position, the tube being shown in dotted outline to show the connecting means.
Figure 4:
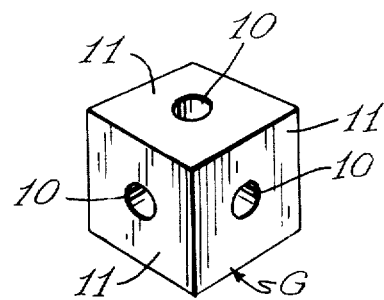
FIG. 4 is a perspective view of a block having three apertures designed to secure the locking means.
Figure 6:
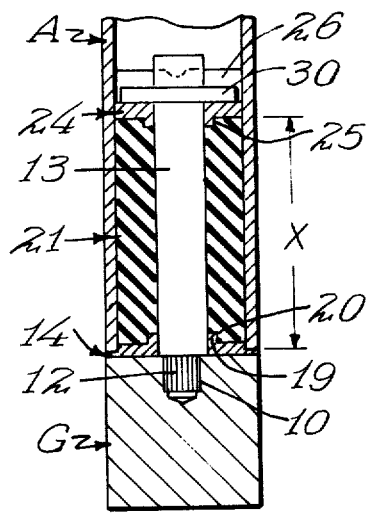
FIG. 6 is a sectional view through the block and the connector with the connector in unlocked or unexpanded position.
Figure 7:
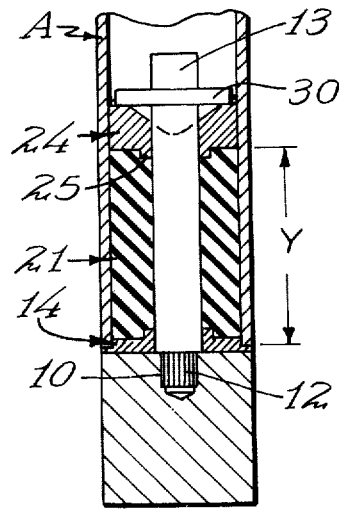
FIG. 7 is a view similar to FIG. 6 but showing the expandable member in expanded or locked position.

When thus assembled, the square tube A is extended over the connecting member in the manner illustrated in the FIGS. 5, 6 and 7 of the drawings. During this process, the pin 30 rests at the bottom of the groove 26 in the cam plate 24 as illustrated in FIG. 6 of the drawings. When in this position the expandable member 21 is of a length indicated by the letter X in FIG. 6 of the drawings and forms a noninterfering or slip fitwith the tube A. In order to secure the tube A to the block G, the tube A is rotated 90°about its axis in either direction in the manner illustrated in FIG. 5 of the drawings. This causes the pin 30 to engage opposite sides of the groove 26, forcing the cam plate 24 downwardly and compressing the expandable member 21. When the tubular member A has been rotated 90°, the pin 30 engages in the indentations 27 on opposite sides of the groove 26, and the expandable member 21 is of a length Y indicated in FIG. 7 of the drawings. In compressing, the expandable member is urged against the inside corners of the tubular member A so firmly that it cannot be removed by hand. In other words, the connection is sufficiently strong so that the two parts cannot be separated. Obviously, when the pin 30 is engaged in the notches 27, the entire connecting means as well as the square tube A will be aligned with the shape of the surface 11 of the block against which it engages.

In accordance with the Patent Statutes, I have described the principles of construction and operation of my Corner Fitting, and while I have endeavored to set forth the best embodiments, I desire to have it understood that obvious changes may be made within the scope of the following claims without departing from the spirit of my invention.

I claim:

1. A corner fastener for connecting a square block and at least one square tubular member including:
   a central recess in at least one surface of said square block,
   a first pin engaged in said recess and held from rotative or axial movement relative thereto,
   an expandable member of generally rectangular outline encircling said pin,
   a cam plate on said expandable member and rotatable therewith,
   a generally V-shaped notch in the end of said cam plate most remote from said block,
   a cross-pin extending through said first pin intersecting the axis of said pin and extending in said V-shaped notch,
   indentations in said cam plate on opposite sides of said notch,
   an end of said tubular member encircling said expandable member, whereby
   rotation of said tubular member, expandable member and cam plate will displace said cross-pin from the base of said notch into said indentations, compressing the expandable member to secure said tubular member to said block.

2. The structure of claim 1 and in which said indentations are at right angles to said notch.

3. The structure of claim 1 and in which said cross-pin comprises a split tubular expansion pin.

4. The structure of claim 1 and in which expandable member comprises a body generally rectangular in cross-section but including expansion grooves in the walls thereof which engage said tubular member.

5. The structure of claim 1 and including a multi-sided recess in one end of said expandable member and a similarly shaped projection on the cam plate engaging the recess in said expandable member to prevent relative rotation therebetween.

6. The structure of claim 1 and in which said first pin is longitudinally knurled for engagement in said block.

7. The structure in claim 1 and including a bearing plate between said resilient member and said square block.

8. The structure of claim 7 and in which said bearing plate includes a peripheral flange extending between the end of said tubular member and said square block.

9. The structure of claim 7 and including means on said bearing plate cooperable with said expandable member to prevent relative rotation thereof.

10. The structure of claim 1 and including a plurality of tubular members connected to said square block.

* * * * *